United States Patent
Chang et al.

(10) Patent No.: US 7,899,942 B2
(45) Date of Patent: Mar. 1, 2011

(54) SWITCH DEVICE

(75) Inventors: Chao-Huang Chang, Taipei (TW); Chi-Cheng Chia, Taipei (TW)

(73) Assignee: Inventec Corporation, Taipei (TW)

( * ) Notice: Subject to any disclaimer, the term of this patent is extended or adjusted under 35 U.S.C. 154(b) by 1435 days.

(21) Appl. No.: 11/342,204

(22) Filed: Jan. 27, 2006

(65) Prior Publication Data
US 2006/0271710 A1 Nov. 30, 2006

(30) Foreign Application Priority Data
May 24, 2005 (TW) .............................. 94116829 A

(51) Int. Cl.
*G06F 3/00* (2006.01)
*G06F 3/038* (2006.01)
*G09G 5/00* (2006.01)

(52) U.S. Cl. .............................. 710/2; 710/62; 345/204

(58) Field of Classification Search ........................ None
See application file for complete search history.

(56) References Cited

U.S. PATENT DOCUMENTS

| | | | |
|---|---|---|---|
| 5,428,806 A * | 6/1995 | Pocrass | 710/104 |
| 6,567,981 B1 * | 5/2003 | Jeffrey | 725/80 |
| 6,618,774 B1 * | 9/2003 | Dickens et al. | 710/64 |
| 7,376,779 B2 * | 5/2008 | Chu | 710/313 |
| 2004/0177200 A1 * | 9/2004 | Chu | 710/301 |
| 2005/0066000 A1 * | 3/2005 | Liaw et al. | 709/204 |
| 2005/0114894 A1 * | 5/2005 | Hoerl | 725/74 |
| 2007/0040900 A1 * | 2/2007 | Castles | 348/14.08 |

* cited by examiner

*Primary Examiner*—Henry W Tsai
*Assistant Examiner*—Michael Sun
(74) *Attorney, Agent, or Firm*—Peter F. Corless; Steven M. Jensen; Edwards Angell Palmer & Dodge LLP

(57) ABSTRACT

A switch device applicable to a server has at least a display chip set, a switch unit, a logic unit, a first connector and a second connector. The display chip set is used to provide a plurality of video signals. The switch unit and the logic unit are connected to the display chip set to receive at least one of the video signals and switch an output path of the received video signal. The first connector and the second connector are connected to the switch unit and the logic unit for selectively connecting to a display, thereby allowing a server to operate with double display connectors. The two connectors are positioned at different sides of the server, which makes it convenient for the management and maintenance of the server.

7 Claims, 2 Drawing Sheets

SWITCH DEVICE

FIELD OF THE INVENTION

The present invention relates to a switch device and, in particular, to a switch device applicable in a server having at least double display connectors.

BACKGROUND OF THE INVENTION

With the rapid development of computer network techniques, network has become one of the important ways for receiving information now and different servers may provide different services in a network. With respect to the current enterprise working environment, the arrangement of personal computers and some specialized servers is a common IT structure. Generally, servers are mainly managed and maintained by a MIS personnel or a network manager, who must not only take charge of the development and maintenance of information application system for users, but also keep the performance of the information system in an optimum condition.

While managing and maintaining a server, it needs to be connected to a display in order to perform various settings and services on the server via the display. A current server mostly comprises a plurality of swappable hard disks, each of which is electrically connected to an inner mainboard, and one or more power supplies for providing electricity to the mainboard, fan sets, CD-ROMs, or the swappable hard disks etc. At the back side of the server there are, for example, connectors connected to a display, wires connected to external uninterrupted power systems, wires of input and output signals or wires communicating with other servers and systems. Meanwhile, several servers or other different systems are often integrated into one shelf depending on the various requirements of the client, and a large number of wires at the back side of the shelf are needed to integrate components such as casing fans, power supplies, network interfaces and so on. Therefore, these shelves are usually stood near the wall for hiding a large number of wires at the back side thereof.

However, when a MIS personnel wishes to manage and maintain a server, he may have to move the server from behind the shelf near the wall, or even move the shelf itself so as to connect to a display for monitoring the settings of the server system. Thus, it is inconvenient to operate. Moreover, if more than one server need to be managed and maintained simultaneously, the connections between the connectors of the servers and the display has to be changed constantly, which is very time consuming.

Accordingly, in view of the problems in which the connectors are provided at the back side of servers in the conventional technique, there is a need for a way to solve the above-described problems in order to manage and maintain servers effectively.

SUMMARY OF THE INVENTION

According to the above-mentioned problems in the prior art, the primary objective of the present invention is to provide a switch device which makes it convenient for the management and maintenance of servers.

It is another objective of the present invention to provide a switch device which saves time of management and maintenance.

It is a further objective of the present invention to provide a switch device which maintains the quality of video signals.

In order to attain these and other objects disclosed above, the present invention provides a switch device applicable in a server having at least double display connectors. The switch device includes a display chip set, a switch unit, a logic unit, a first connector and a secondary connector.

The display chip set is used to provide a plurality of video signals. The switch unit is connected to the display chip set to receive at least one of the video signals and switch an output path of the received video signal. The logic unit is connected to the display chip set to receive at least one of the video signals and switch an output path of the received video signal. The first connector is connected to the switch unit and the logic unit and can be selectively connected to a display. The second connector is connected to the switch unit and the logic unit and can be selectively connected to a display.

Preferably, the display chip set is an ATI Raye XL, an ATI 7000 or any other appropriate chip set. In one preferable embodiment, the video signals include a tri-color signal, a horizontal signal and a vertical signal. The switch unit selects a tri-color signal and switches an output path of the tri-color signal. The switch unit has a switch for selectively connecting the switch unit to the first connector or the second connector. The logic unit selects a horizontal signal and a vertical signal and switches two output paths of the horizontal signal and the vertical signal respectively. The logic unit includes a combination of logic elements. Meanwhile, the first connector and the second connector are positioned at two different sides of the server, and more preferably, one of the first connector and the second connector is selected to be positioned at a front side of the server for providing two display connectors.

Compared to the conventional techniques, the present invention allows a server to operate with at least double display connectors, where the two connectors are positioned at two different sides of the server. Accordingly, when one of the connectors is in the direction that is not easy for use, the connector at a different side can be used to manage and maintain the server. Thus, the operational and time-consuming problems caused by setting the connectors only at the back side of the server may be solved, which makes it convenient to manage and maintain the server and also saves management and maintenance time. Moreover, the connectors that provide video signals are controlled by the switch device, such that the quality of the video signals is also maintained.

As a result, the switch device of the present invention has the characteristics of providing convenience for management and maintenance of servers, which allows a MIS personnel or a network manager to manage and maintain the servers quickly. In addition to maintaining the performance of the information systems in an optimum behavior, it may further save the time consumed in management and maintenance and also maintain the quality of video signal. Therefore, the present invention may overcome the problems in design of the server of the previous techniques, and also increase the using values in industry.

The following embodiments are provided to illustrate the disclosure of the present invention, these and other advantages and effects can be apparently understood by those with ordinary skilled in the art after reading the disclosure of this specification. The present invention can also be performed or applied by other different embodiments. The details of the specification may be based on different points and applications, and numerous modifications and variations can be derived without departing from the spirit of the present invention.

DISCLOSURE OF THE INVENTION

The following embodiment further describes the aspects of the present invention in details, but it is not construed as to limit the scope of the present invention in any way.

Figure 1:
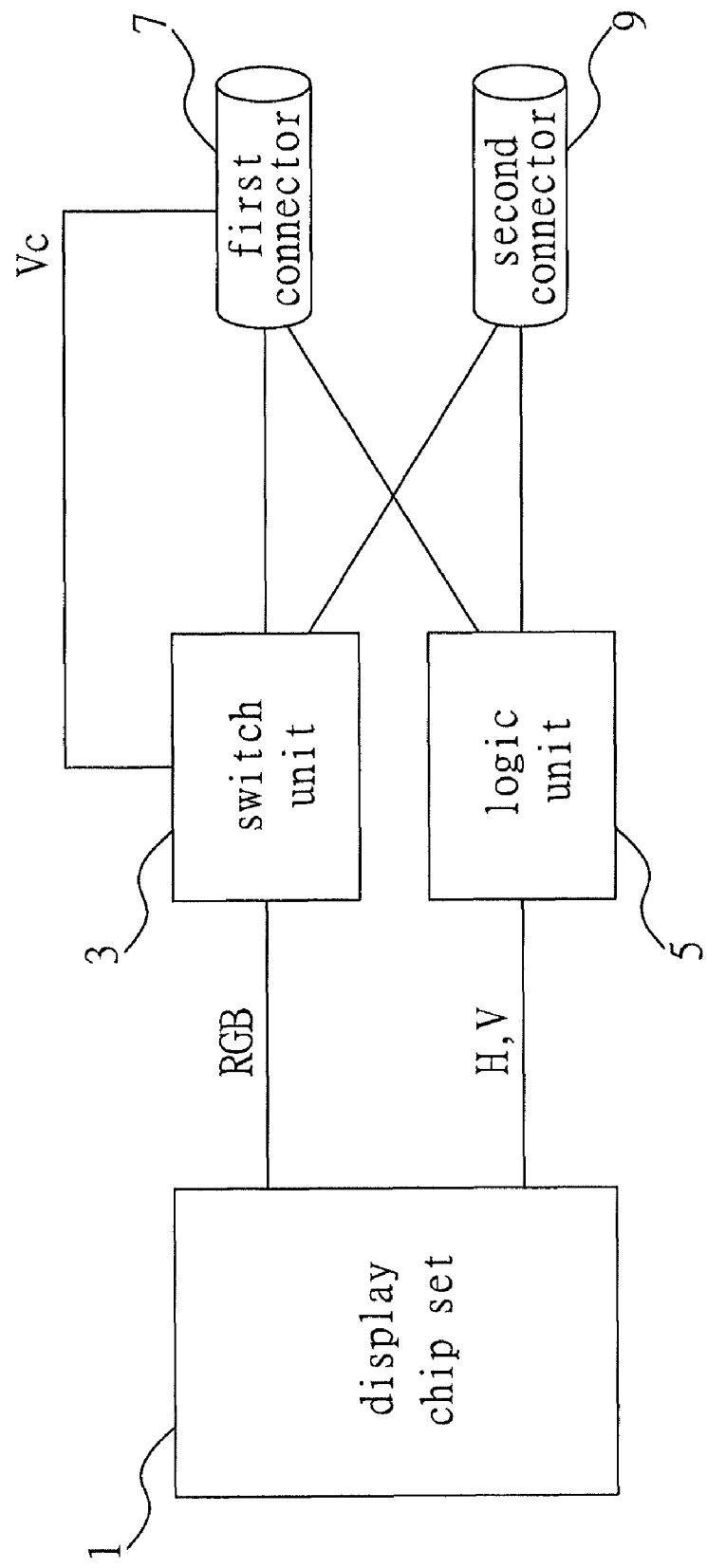
FIG. 1 is a functional block diagram showing a structure of a switch device of the preferred embodiment according to the present invention.
Figure 2:
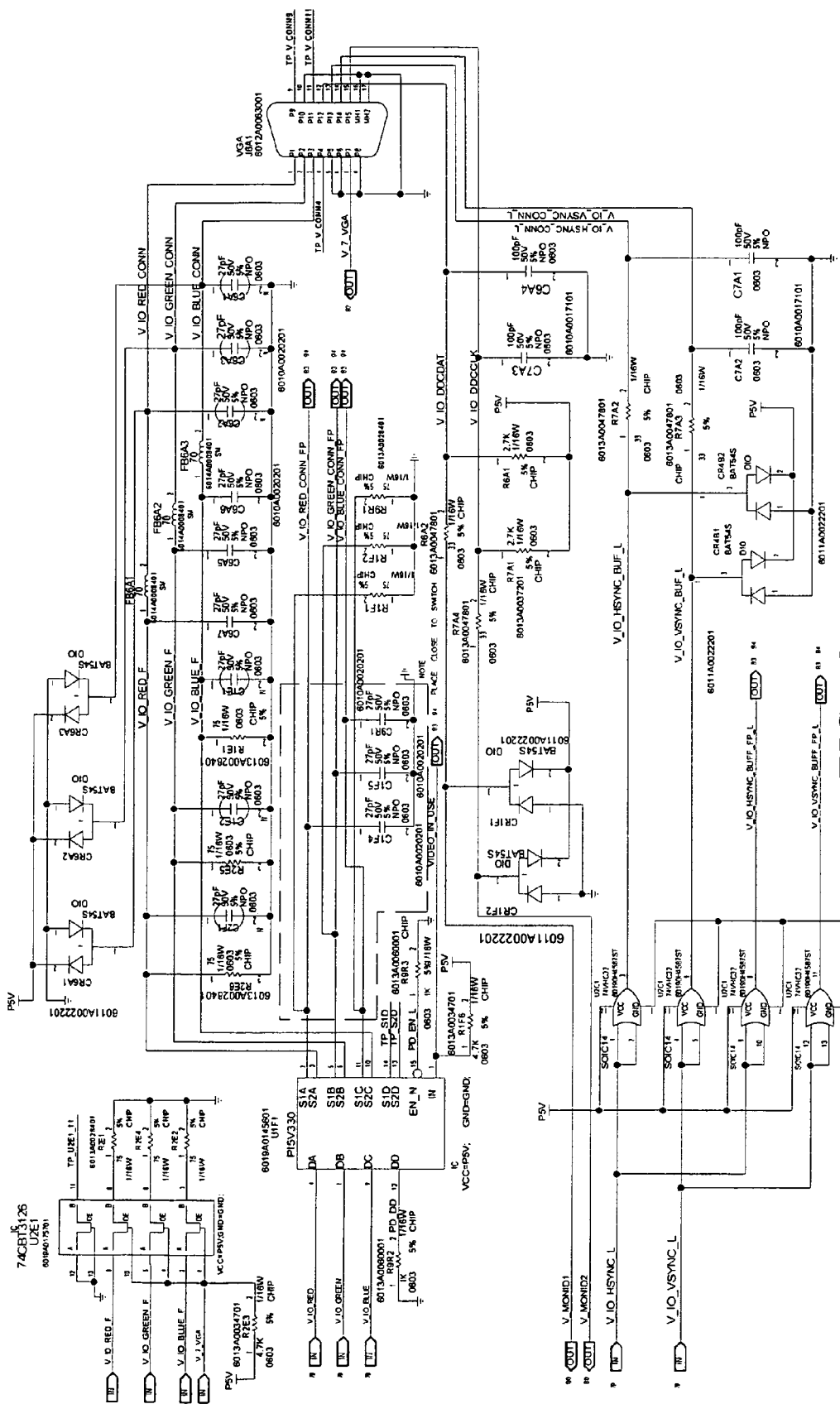
FIG. 2 is a circuit diagram of the switch device shown in FIG. 1.

FIG. 1 and FIG. 2 are diagrams according to a switch device of the present device. As shown in FIG. 1, the switch device of the present invention comprises a display chip set 1, a switch unit 3, a logic unit 5, a first connector 7 and a second connector 9. It should be noted that the switch device of the present invention is applicable in a server having double display connectors. Since the structure and the operating principle of the server are well known to those in the art, further descriptions are hereby omitted and only the characteristics related to the present invention are illustrated in the embodiment herein.

The display chip set 1 is used to provide a plurality of video signals. In the embodiment, the display chip set is one selected from a group consisting of an ATI Raye XL, an ATI 7000 or other appropriate chip set. The video signals provided by the display chip set 1 comprise a tri-color signal RGB, a horizontal signal H and a vertical signal V, but not limited to these.

The switch unit 3 is connected to the display chip set 1 to receive at least one of the video signals and switch an output path of the received video signal. In the embodiment, the switch unit 3 selects the tri-color signal RGB and switches an output path of the tri-color signal RGB. The switch unit 3 further comprises a switch for selectively connecting the switch unit 3 to the first connector 7 or the second connector 9, and it will be described in details below.

The logic unit 5 is connected to the display chip set 1 to receive one of the video signals and switch an output path of the received video signal. In the embodiment, the logic unit 5 selects the horizontal signal H and vertical signal V and switches two output paths of the horizontal signal H and vertical signal V respectively. The logic unit 5 is preferably a combination of logic elements, but not be limited to this.

The first connector 7 is connected to the switch unit 3 and the logic unit 5, and can be connected to a display selectively (not shown).

The second connector 9 is connected to the switch unit 3 and the logic unit 5, and can be connected to a display selectively (not shown).

The first connector 7 and the second connector 9 are positioned at two different sides of the server. Preferably, one of the first connector 7 and the second connector 9 is selected to be arranged at a front side of the server for providing double display connectors.

Referring to FIG. 2 in conjunction with FIG. 1, the switch in the switch unit 3 is connected to the first connector 7 if the second connector 9 is not connected to a display, and the switch unit 3 and the logic unit 5 will provide the video signals such as the tri-color signal RGB, the horizontal signal H and the vertical signal V to the first connector 7. While the display is connected to the second connector 9, the second connector 9 provides a control signal Vc to the switch unit 3 and the logic unit 5, then the switch in the switch unit 3 will be connected to the second connector 9, and the switch unit 3 and the logic unit 5 will provide the video signals such as the tri-color signal RGB, the horizontal signal H and the vertical signal H to the second connector 9.

When the display is plugged in the second connector 9, a VIDEO_IN_USE is shorted to ground by the second connector 9 and becomes LOW, thereafter the tri-color signal RGB will be switched to the second connector 9. While the display is not plugged in the second connector 9, the VIDEO_IN_USE is pulled HIGH by a resistor, thereafter the tri-color signal RGB is switched to be connected to the first connector 7 and a signal wire (V_7_VGA) will be connected to a resistor which is used to convert a current source to a voltage.

The present invention is different from the prior art in that, the server used in the present invention has at least double display connectors, one at the front side of the server. So while managing and maintaining the server, the display may be fixed to the back side of the server or connected to the connector at the front side of the server, and it may be switched automatically by the switch device. In this way, the inconvenience of the previous techniques, i.e. when a MIS personnel manages and maintains the server, he/she has to move the server or even the shelf containing the server in order to connect a connector of the server to a display, can be solved. Accordingly, the present invention provides double display connectors, which allows the server to have a connector at the front side so as to offer convenience in management and maintenance of the server, and controls the connectors providing video signals by the switch device to maintain the quality of the video signals. Meanwhile, time consumed for management and maintenance may be saved as the switch device of the present invention is convenient for the management and maintenance of servers.

In summary, the switch device of the present invention can solve the problems of the conventional techniques, and effectively increase industrial application value.

The foregoing description only illustrates the detailed embodiments of the present invention, which should not be construed as to limit the scope of the present invention. It should be understood by those with ordinary skill in the art that all modifications or variations according to the spirit and principle disclosed by the present invention should fall within the scope of the appended claims.

What is claimed is:

1. A switch device applicable in a server having at least double display connectors, the switch device comprising:
   a display chip set for providing a plurality of video signals;
   a switch unit connected to said display chip set for receiving at least one of the video signals and switching an output path of said received video signal;
   a logic unit connected to said display chip set for receiving at least one of the video signals and switch an output path of said received video signal;
   a first connector connected to said switch unit and said logic unit for selectively connecting to a display; and
   a second connector connected to said switch unit and said logic unit for selectively connecting to a display,
   wherein said switch unit comprises a switch for selectively connecting said switch unit to said first connector or to said second connector,
   wherein, when said second connector is not connected to the display, the switch is connected to said first connector, and said switch unit and said logic unit provide the video signals to said first connector, wherein, when said second connector is connected to the display, said second connector provides a control signal to said switch unit and said logic unit, then the switch is connected to said second connector, and said switch unit and said logic unit provide the video signals to said second connector, wherein, when the display is plugged in said second connector, a VIDEO_IN_USE is shorted to ground by said second connector and becomes LOW, thereafter a tri-color signal in the video signals is switched to said second connector, and wherein, when the display is not plugged in said second connector, the VIDEO_IN_USE is pulled HIGH by a resistor, thereafter the tri-color signal is switched to be connected to said first connector, and a signal wire is connected to another resistor which is used to convert a current source to a voltage.

2. The switch device of claim 1, wherein said video signals further comprise a horizontal signal and a vertical signal.

3. The switch device of claim 1, wherein said switch unit receives the tri-color signal and switches the output path of said tri-color signal.

4. The switch device of claim 2, wherein said logic unit receives the horizontal signal and the vertical signal and switches the output paths of said horizontal signal and said vertical signal.

5. The switch device of claim 1, wherein said logic unit comprises a combination of logic elements.

6. The switch device of claim 1, wherein said first connector and said second connector are positioned at different sides of said server.

7. The switch device of claim 6, wherein one of said first connector and said second connector is set at a front side of said server.

* * * * *